(12) United States Patent
Yanniello et al.

(10) Patent No.: US 8,178,801 B2
(45) Date of Patent: May 15, 2012

(54) ELECTRICAL SWITCHING APPARATUS INCLUDING A CARRIER, AND POLE FOR THE SAME

(75) Inventors: Robert Yanniello, Asheville, NC (US); Giles D. Barnwell, Nottingham (GB)

(73) Assignee: Eaton Corporation, Cleveland, OH (US)

(*) Notice: Subject to any disclaimer, the term of this patent is extended or adjusted under 35 U.S.C. 154(b) by 240 days.

(21) Appl. No.: 12/748,507

(22) Filed: Mar. 29, 2010

(65) Prior Publication Data

US 2011/0233035 A1    Sep. 29, 2011

(51) Int. Cl.
*H01H 1/64* (2006.01)
(52) U.S. Cl. ........................................ 200/293; 218/120
(58) Field of Classification Search .................. 200/293, 200/237, 302.1, 49; 218/138, 134, 120, 140, 218/153; 439/587
See application file for complete search history.

(56) References Cited

U.S. PATENT DOCUMENTS

| | | | |
|---|---|---|---|
| 3,966,294 A | 6/1976 | Benton | |
| 4,568,804 A * | 2/1986 | Luehring | 218/138 |
| 5,175,403 A * | 12/1992 | Hamm et al. | 218/120 |
| 5,753,876 A | 5/1998 | Lanning | |
| 6,198,062 B1 * | 3/2001 | Mather et al. | 218/152 |
| 7,186,942 B1 | 3/2007 | Slade et al. | |
| 7,473,863 B2 | 1/2009 | Schreiber et al. | |
| 7,479,612 B2 * | 1/2009 | Waldi et al. | 200/507 |
| 2004/0144757 A1 * | 7/2004 | Rhein et al. | 218/120 |

* cited by examiner

*Primary Examiner* — Edwin A. Leon
(74) *Attorney, Agent, or Firm* — John A. Kastelic; Martin J. Moran

(57) ABSTRACT

An electrical switching apparatus includes a number of poles each having an elongated conductor with a first end and an opposite second end with a first terminal member. A circuit interrupter is electrically connected in series with the elongated conductor at the first end. A second terminal member electrically engages the first terminal member. A number of insulative skirts are disposed on the elongated conductor between opposite ends thereof. An insulative tube receives the insulative skirts and includes a first open end and an opposite second end carrying the second terminal member. A carrier carries the poles between (a) a first position in which the first terminal member electrically engages the second terminal member and the insulative tube receives the insulative skirts, and (b) a second position in which the first terminal member is electrically disconnected from the second terminal member and the skirts are withdrawn from the insulative tube.

22 Claims, 4 Drawing Sheets

ELECTRICAL SWITCHING APPARATUS INCLUDING A CARRIER, AND POLE FOR THE SAME

BACKGROUND

1. Field

The disclosed concept pertains generally to electrical switching apparatus and, more particularly, to such electrical switching apparatus including a carrier, such as, for example and without limitation, a draw-out/draw-in mechanism. The disclosed concept also pertains to poles for electrical switching apparatus including a carrier.

2. Background Information

Skirts or bushing insulators are commonly employed to provide increased surface distance between two fixed conductors of different potentials while permitting a reduction in distance between those fixed conductors. For example, U.S. Pat. No. 3,966,294 discloses a power distribution transformer having a high-voltage bushing fixedly mounted on a transformer tank. The high-voltage bushing includes a bushing insulator constructed of a suitable material, such as porcelain or epoxy. A lightning arrester having an adjustable arrester probe is also fixedly attached to the tank.

It is known to employ epoxy and silicone skirts in electrical equipment, such as high voltage sensors. For example, U.S. Pat. No. 7,473,863 discloses an epoxy glass tube covered by a silicone rubber skirt. Circumferential ribs are included along the length of silicone rubber skirt in order to increase the "creep distance" (the length of the insulating surface), and to thereby help prevent debilitating short circuits and generally improve dielectric properties of the epoxy glass tube and associated elements. The silicone rubber skirt is affixed to the epoxy glass tube using a room temperature vulcanizing ("RTV") silicone rubber-based adhesive.

There is room for improvement in electrical switching apparatus including a carrier.

There is further room for improvement in poles for electrical switching apparatus including a carrier.

SUMMARY

These needs and others are met by embodiments of the disclosed concept in which a number of insulative skirts are disposed on an elongated conductor between a first end and an opposite second end thereof. A first terminal member is disposed at the opposite second end. An insulative tube is structured to receive the number of insulative skirts and includes a first open end and an opposite second end carrying a second terminal member. A carrier carries a number of poles between (a) a first position in which the first terminal member electrically engages the second terminal member and the insulative tube receives the number of insulative skirts, and (b) a second position in which the first terminal member is electrically disconnected from the second terminal member and the number of insulative skirts are withdrawn from the insulative tube.

In accordance with one aspect of the disclosed concept, an electrical switching apparatus comprises: a number of poles, each of the number of poles comprising: an elongated conductor including a first end, an opposite second end and a first terminal member disposed at the opposite second end, a circuit interrupter electrically connected in series with the elongated conductor at the first end of the elongated conductor, a second terminal member structured to electrically engage the first terminal member, a number of insulative skirts disposed on the elongated conductor between the first end and the opposite second end thereof, and an insulative tube structured to receive the number of insulative skirts, the insulative tube including a first open end and an opposite second end carrying the second terminal member; and a carrier carrying the number of poles between (a) a first position in which the first terminal member electrically engages the second terminal member and the insulative tube receives the number of insulative skirts, and (b) a second position in which the first terminal member is electrically disconnected from the second terminal member and the number of insulative skirts are withdrawn from the insulative tube.

The insulative tube may include a smooth interior surface that engages the number of insulative skirts in the first position.

The insulative tube may include a number of annular ribs disposed from a smooth interior surface; and each one of the number of annular ribs may engage one insulative skirt of the number of insulative skirts.

The number of insulative skirts may be a number of first insulative skirts; the insulative tube may include an interior surface carrying a number of second insulative skirts; and each one of the number of first insulative skirts may engage one insulative skirt of the number of second insulative skirts in the first position.

As another aspect of the disclosed concept, an electrical switching apparatus comprises: a number of poles, each of the number of poles comprising: an elongated first conductor including a first end, an opposite second end and a first terminal member disposed at the opposite second end, an elongated second conductor including a first end, an opposite second end and a second terminal member disposed at the opposite second end of the elongated second conductor, separable contacts electrically connected between the first end of the elongated first conductor and the first end of the elongated second conductor, a third terminal member structured to electrically engage the first terminal member, a fourth terminal member structured to electrically engage the second terminal member, a number of first insulative skirts disposed on the elongated first conductor between the first end and the opposite second end thereof, a number of second insulative skirts disposed on the elongated second conductor between the first end and the opposite second end thereof, a first insulative tube structured to receive the number of first insulative skirts, the first insulative tube including a first open end and an opposite second end carrying the third terminal member, and a second insulative tube structured to receive the number of second insulative skirts, the second insulative tube including a first open end and an opposite second end carrying the fourth terminal member; and a carrier carrying the number of poles between: (a) a first position in which the first terminal member electrically engages the third terminal member, the second terminal member electrically engages the fourth terminal member, the first insulative tube receives the number of first insulative skirts, and the second insulative tube receives the number of second insulative skirts, and (b) a second position in which the first terminal member is electrically disconnected from the third terminal member and the number of first insulative skirts are withdrawn from the first insulative tube, and the second terminal member is electrically disconnected from the fourth terminal member and the number of second insulative skirts are withdrawn from the second insulative tube.

As another aspect of the disclosed concept, a pole is for an electrical switching apparatus including a carrier carrying the pole between a first position and a second position. The pole comprises: an elongated conductor including a first end, an opposite second end and a first terminal member disposed at the opposite second end; a circuit interrupter electrically connected in series with the elongated conductor at the first end of the elongated conductor; a second terminal member structured to electrically engage the first terminal member; a number of insulative skirts disposed on the elongated conductor between the first end and the opposite second end thereof; and an insulative tube structured to receive the number of insulative skirts, the insulative tube including a first open end and an opposite second end carrying the second terminal member, wherein the first terminal member is structured to electrically engage the second terminal member and the insulative tube is structured to receive the number of insulative skirts in the first position, and wherein the first terminal member is structured to electrically disconnect from the second terminal member and the number of insulative skirts are structured to be withdrawn from the insulative tube in the second position.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "skirt" means a flexible insulator or a flexible shed, which skirt is structured to provide increased creep distance, increased dielectric withstand capability and/or reduced conductor length(s) for medium voltage applications. Such a skirt can have, for example and without limitation, a disk-like shape in a non-engaged position and a skirt-like shape in an engaged position.

The disclosed concept is described in association with a three-pole vacuum circuit breaker, although the disclosed concept is applicable to a wide range of electrical switching apparatus having any number of poles or phases, such as, for example and without limitation, circuit breakers, circuit breaker disconnects, tie circuit breakers (e.g., operating between circuits with potentially different voltages and/or different phases), switches and isolation trucks (e.g., providing a fused or switched input to a transformer).

The disclosed concept is advantageously applied to a number of different fixed and movable conductors where increased creep distance, increased dielectric withstand capability and/or reduced conductor lengths are desired.

Figure 1:
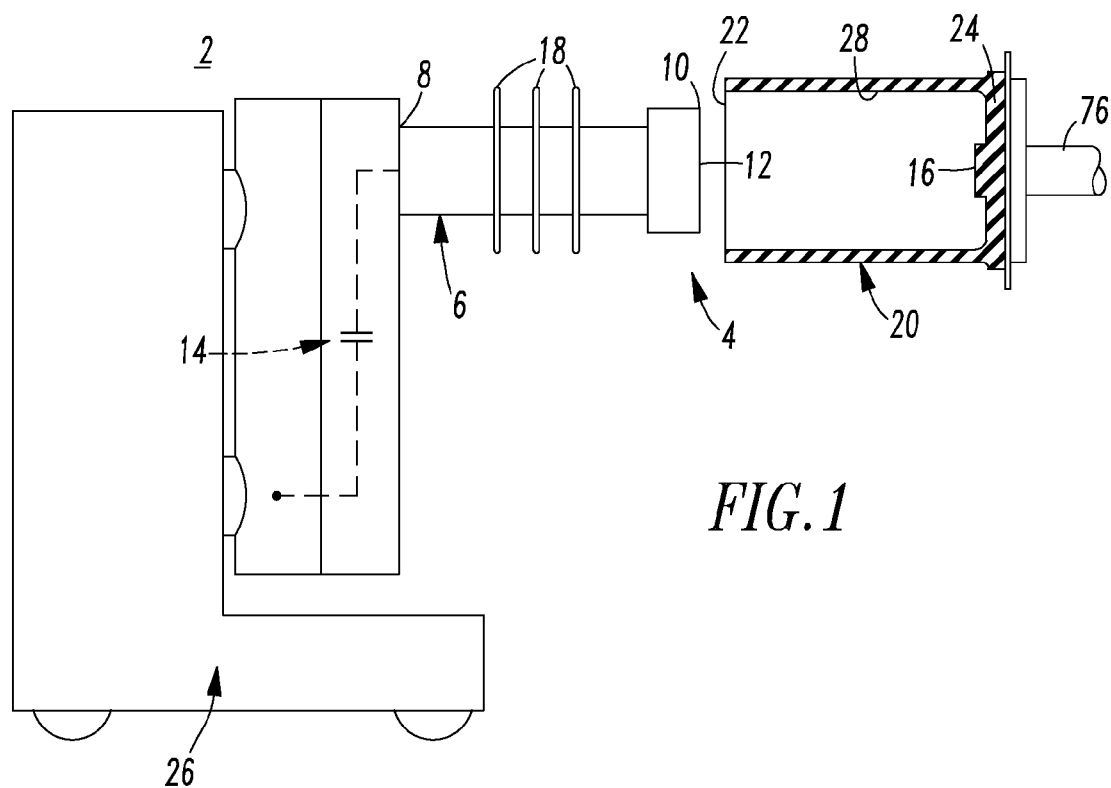
FIG. 1 is a vertical elevation view of a draw-out vacuum circuit breaker in a drawn-out position in accordance with embodiments of the disclosed concept.
Figure 2:
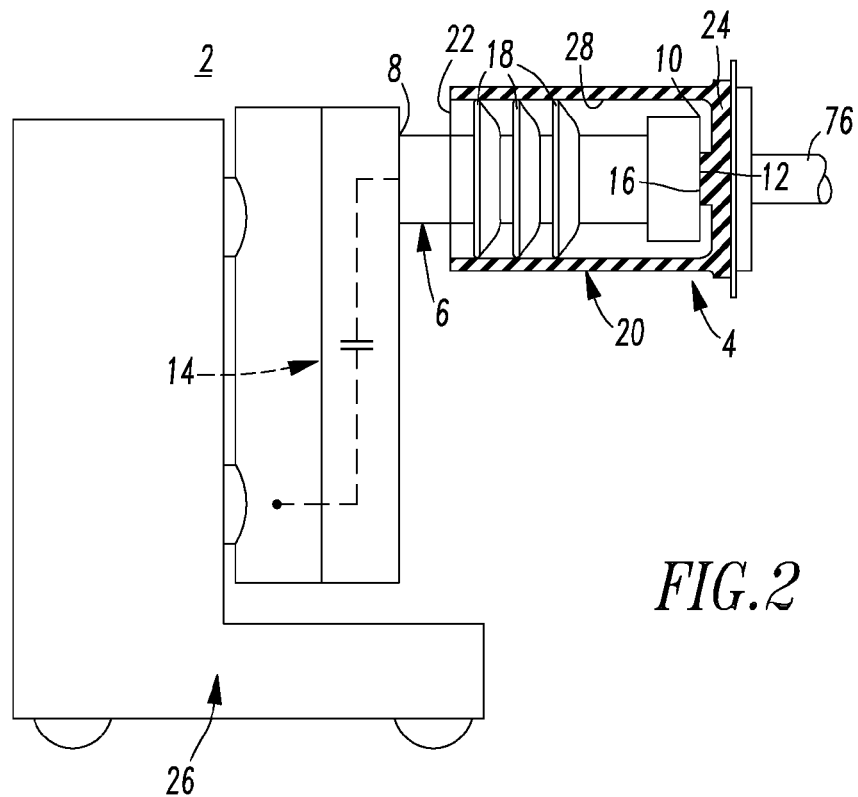
FIG. 2 is a vertical elevation view of the draw-out vacuum circuit breaker of FIG. 1 in the drawn-in position.

Referring to FIGS. 1 and 2, an electrical switching apparatus 2 includes a number of poles 4 (e.g., only one example pole 4 is shown). The example pole 4 includes an elongated conductor 6 including a first end 8, an opposite second end 10 and a first terminal member 12 disposed at the opposite second end 10. A circuit interrupter 14 (e.g., without limitation, a fuse; a vacuum circuit interrupter; an air circuit interrupter; an SF6 circuit interrupter) (shown in hidden line drawing) is electrically connected in series with the elongated conductor 6 at the first end 8 thereof. A second terminal member 16 is structured to electrically engage the first terminal member 12 as shown in FIG. 2.

A number of insulative skirts 18 are disposed on the elongated conductor 6 between the first end 8 and the opposite second end 10 thereof. An insulative tube 20 (e.g., without limitation, a spout) (shown in cross-section) is structured to receive the number of insulative skirts 18 as shown in FIG. 2. The insulative tube 20 includes a first open end 22 and an opposite second end 24 carrying the second terminal member 16. A carrier 26 carries the number of poles 4 between (a) a first position (FIG. 2) in which the first terminal member 12 electrically engages the second terminal member 16 and the insulative tube 20 receives the number of insulative skirts 18, and (b) a second position (FIG. 1) in which the first terminal member 12 is electrically disconnected from the second terminal member 16 and the number of insulative skirts 18 are withdrawn from the insulative tube 20.

The example electrical switching apparatus 2 can be used, for example and without limitation, in connection with energizing a transformer (not shown) having a number of phases (not shown) corresponding to the number of poles 4. For example and without limitation, there could be three phases (not shown) corresponding to three of the poles 4, and the transformer could be a delta-wye (Δ-Y) transformer having primary windings configured in a delta (Δ) configuration to convert three-phase electric power without a neutral wire into three-phase electric power with a neutral wire (not shown). It will be appreciated that the electrical switching apparatus 2 could be electrically connected to many different types of loads and/or apparatus having any number of poles or phases.

EXAMPLE 1

The number of insulative skirts 18 can be made of a material selected from the group consisting of silicone and polyvinyl chloride (PVC or IUPAC Poly(chloroethanediyl)). Alternatively, any other suitable flexible, relatively high dielectric material can be employed.

EXAMPLE 2

The insulative tube 20 can include a smooth interior surface 28 that engages the number of insulative skirts 18 in the first position (e.g., closed position shown in FIG. 2). In this example, since the diameter of the insulative skirts 18 exceeds the inner diameter of the insulative tube 20, the flexible insulative skirts 18 deflect and provide a suitable engagement with the smooth interior surface 28.

EXAMPLE 3

Figure 5:
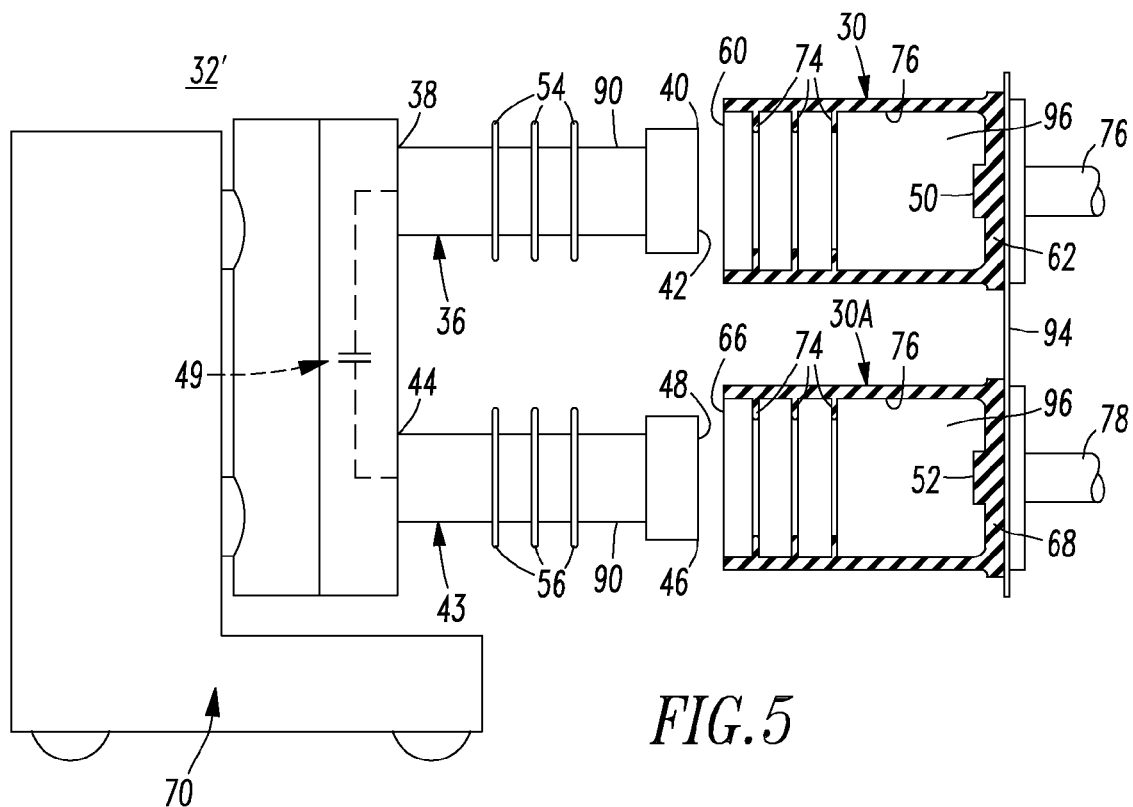
FIG. 5 is a vertical elevation view of a draw-out vacuum circuit breaker in a drawn-out position in accordance with another embodiment of the disclosed concept.
Figure 6:
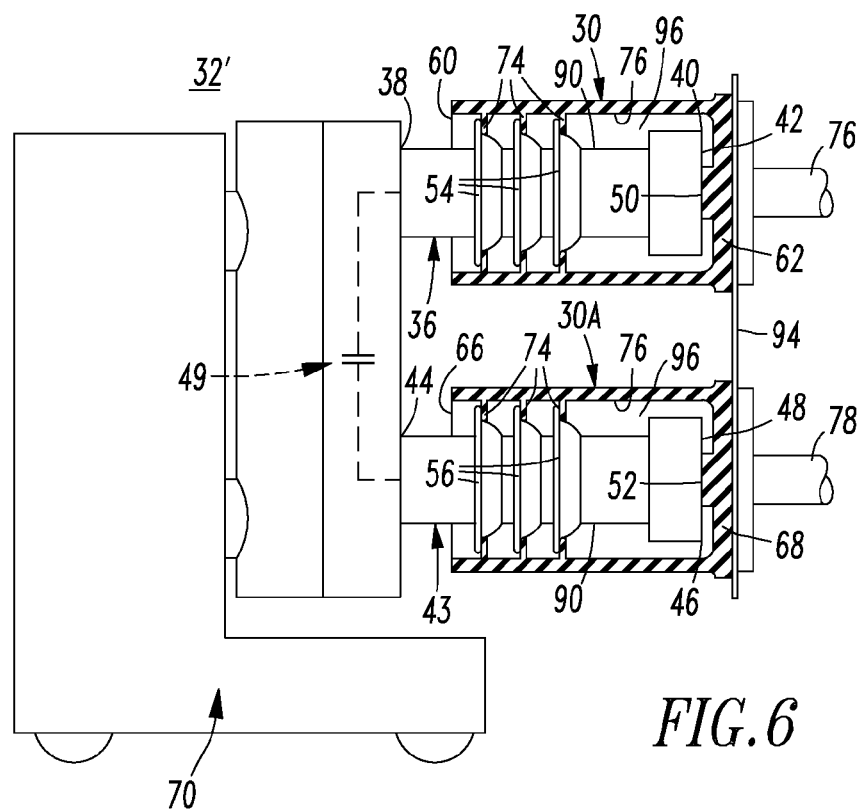
FIG. 6 is a vertical elevation view of the draw-out vacuum circuit breaker of FIG. 5 in the drawn-in position.

Although the insulative tube 20 is shown in FIGS. 1 and 2, the electrical switching apparatus 2 can employ an insulative tube 30 as shown in FIGS. 5 and 6.

EXAMPLE 4

Figure 7:
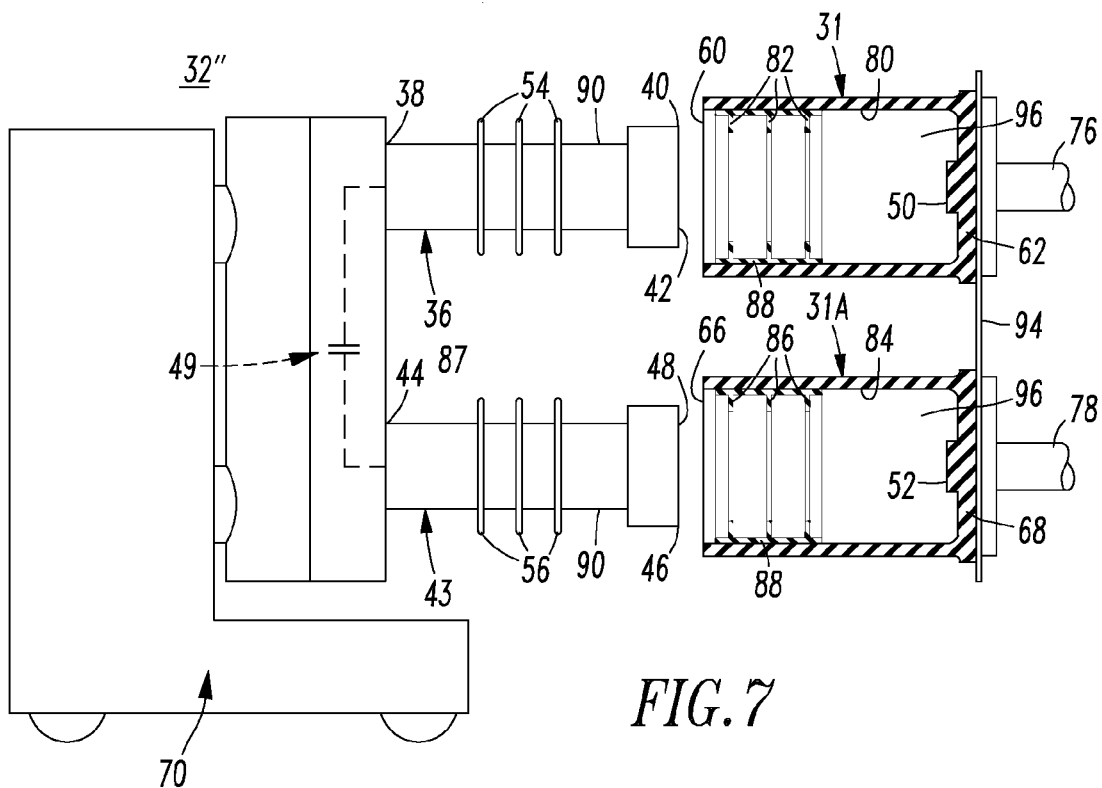
FIG. 7 is a vertical elevation view of a draw-out vacuum circuit breaker in a drawn-out position in accordance with another embodiment of the disclosed concept.
Figure 8:
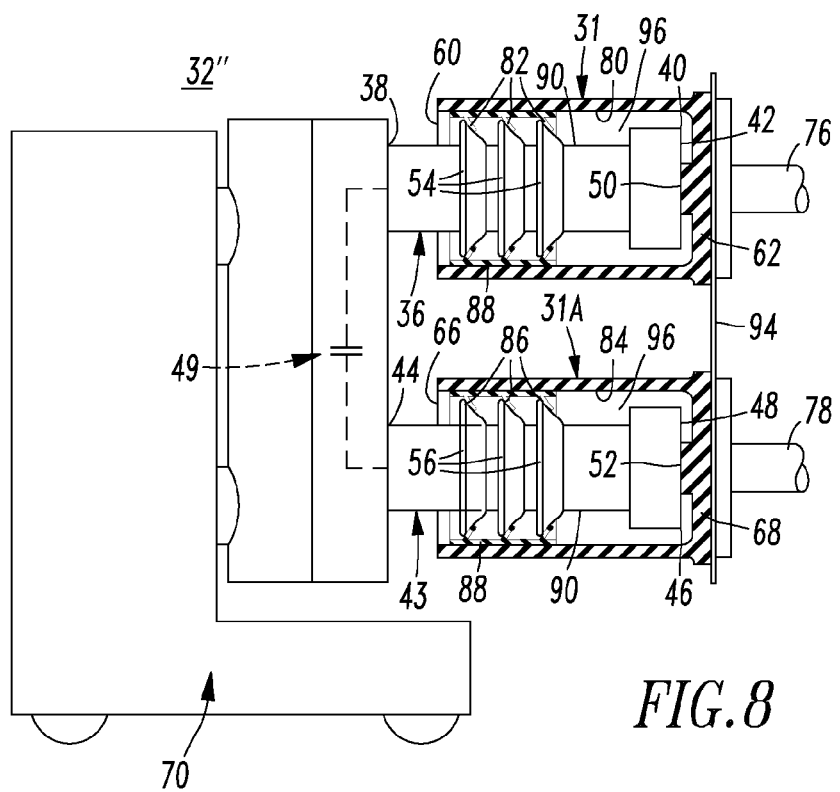
FIG. 8 is a vertical elevation view of the draw-out vacuum circuit breaker of FIG. 7 in the drawn-in position.

As another alternative to the insulative tube 20, the electrical switching apparatus 2 can employ an insulative tube 31 as shown in FIGS. 7 and 8.

Figure 3:
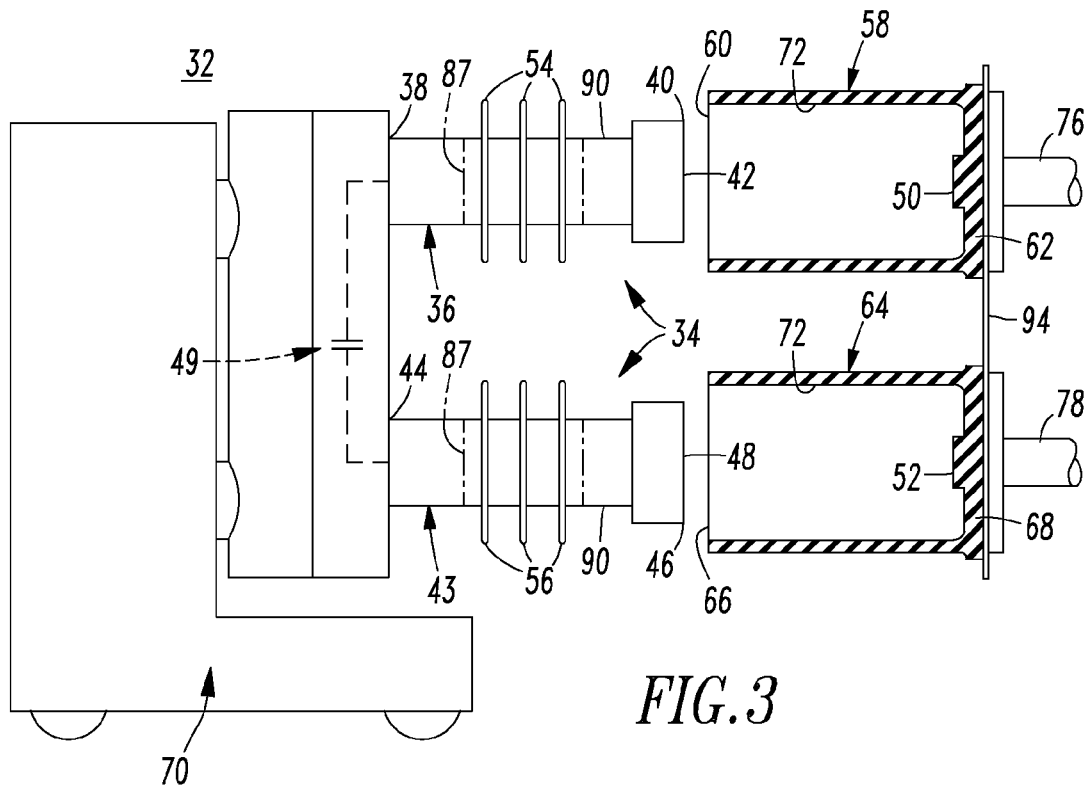
FIG. 3 is a vertical elevation view of a draw-out vacuum circuit breaker in a drawn-out position in accordance with another embodiment of the disclosed concept.
Figure 4:
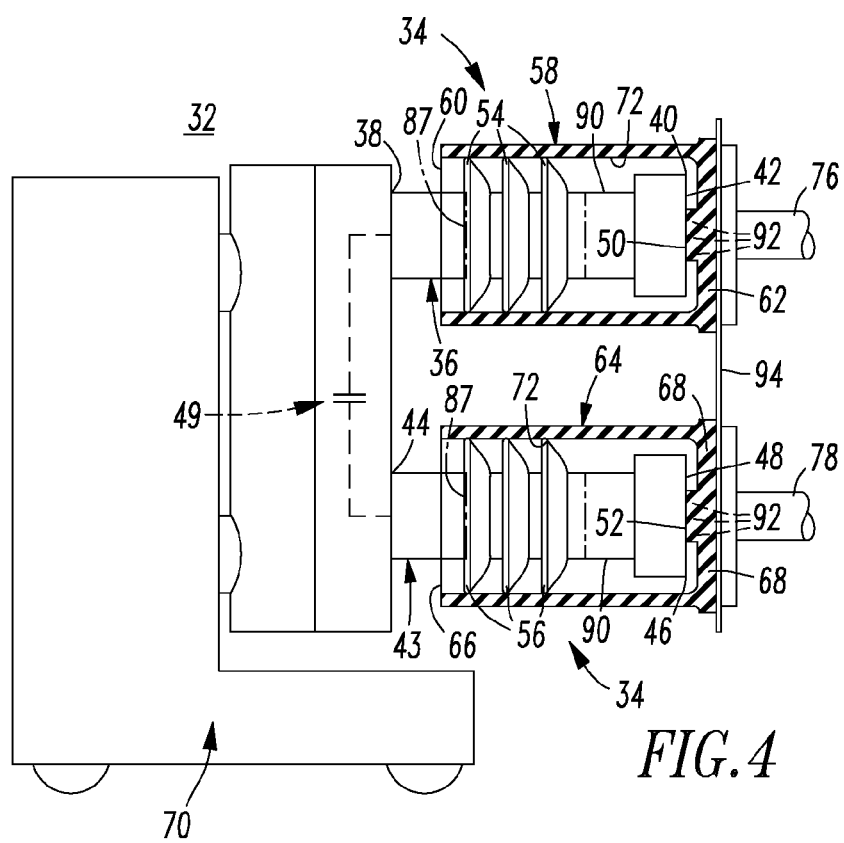
FIG. 4 is a vertical elevation view of the draw-out vacuum circuit breaker of FIG. 3 in the drawn-in position.

Referring to FIGS. 3 and 4, an electrical switching apparatus 32 includes a number of poles 34 (only one example pole 34 is shown). The example pole 34 includes an elongated first conductor 36 including a first end 38, an opposite second end 40 and a first terminal member 42 disposed at the opposite second end 40. An elongated second conductor 43 includes a first end 44, an opposite second end 46 and a second terminal member 48 disposed at the opposite second end 46. Separable contacts 49 (e.g., without limitation, a fuse; a vacuum circuit interrupter; an air circuit interrupter; an SF6 circuit interrupter) (shown in hidden line drawing) are electrically connected between the first end 38 of the elongated first conductor 36 and the first end 44 of the elongated second conductor 43. A third terminal member 50 is structured to electrically engage the first terminal member 42. A fourth terminal member 52 is structured to electrically engage the second terminal member 48.

A number of first insulative skirts 54 are disposed on the elongated first conductor 36 between the first end 38 and the opposite second end 40 thereof. A number of second insulative skirts 56 are disposed on the elongated second conductor 43 between the first end 44 and the opposite second end 46 thereof. A first insulative tube 58 (e.g., without limitation, a spout) (shown in cross-section) is structured to receive the number of first insulative skirts 54. The first insulative tube 58 includes a first open end 60 and an opposite second end 62 carrying the third terminal member 50. A second insulative tube 64 (e.g., without limitation, a spout) (shown in cross-section) is structured to receive the number of second insulative skirts 56 and includes a first open end 66 and an opposite second end 68 carrying the fourth terminal member 52. A carrier 70 carries the number of poles 34 between: (a) a first position (e.g., without limitation, drawn-in; FIG. 4) in which the first terminal member 42 electrically engages the third terminal member 50, the second terminal member 48 electrically engages the fourth terminal member 52, the first insulative tube 58 receives the number of first insulative skirts 54, and the second insulative tube 64 receives the number of second insulative skirts 56, and (b) a second position (e.g., without limitation, drawn-out FIG. 3) in which the first terminal member 42 is electrically disconnected from the third terminal member 50 and the number of first insulative skirts 54 are withdrawn from the first insulative tube 58, and the second terminal member 48 is electrically disconnected from the fourth terminal member 52 and the number of second insulative skirts 56 are withdrawn from the second insulative tube 64.

The example insulative tubes 58, 64 and the number of first and second insulative skirts 54, 56 permit the electrical switching apparatus 32 to operate with relatively greater dielectric withstand capability, and permit the elongated first and second conductors 36, 43 and insulative tubes 58, 64 to be relatively shorter. For example and without limitation, a worst case condition can arise when the third terminal member 50 is energized with a line voltage (e.g., without limitation, 13 kV; 38 kV; any suitable medium voltage), the separable contacts 49 are open, and the fourth terminal member 52 is either grounded or energized with a different potential (e.g., a different line voltage; a different line voltage phase angle).

EXAMPLE 5

The example electrical switching apparatus 32 can be selected from the group consisting of a vacuum circuit interrupter, an air circuit interrupter; an SF6 circuit interrupter, and a fuse.

EXAMPLE 6

Each of the number of first and second insulative skirts 54, 56 can be made of a material selected from the group consisting of silicone and PVC. Alternatively, any other suitable flexible, relatively high dielectric material can be employed. These insulative skirts 54, 56 can be the same as or similar to the insulative skirts 18 of FIG. 1.

EXAMPLE 7

Each of the first and second insulative tubes 58, 64 can include a smooth interior surface 72 that engages the number of first and second insulative skirts 54, 56, respectively, in the first position (FIG. 3). These insulative tubes 58, 64 can be the same as or similar to the insulative tube 20 of FIG. 1.

EXAMPLE 8

Further to Example 3, as shown in FIGS. 5 and 6, an electrical switching apparatus 32', which is similar to the electrical switching apparatus 32 of FIGS. 3 and 4, employs the insulative tubes 30, 30A. Each of the first and second insulative tubes 30, 30A includes a number of annular ribs 74 disposed from a smooth interior surface 76. Each one of the number of annular ribs 74 engages one insulative skirt of the number of first and second insulative skirts 54, 56 as shown in FIG. 6.

The count of the number of annular ribs 74 can be greater than or equal to (as shown in FIGS. 5 and 6) the count of the number of insulative skirts 54 or 56. The count of the annular ribs 74 is dictated by the desired dielectric withstand capability since the annular ribs 74 increase the over surface tracking path between the opposite ends of the insulative tubes 30, 30A. The annular ribs 74 advantageously function to provide extended creep distance, provide a relatively better seal, and provide relatively better moisture protection than corresponding structures in the electrical switching apparatus 32 of FIG. 3. Except for the annular ribs 74, the electrical switching apparatus 32' can be the same as or similar to the electrical apparatus 32 of FIG. 3.

EXAMPLE 9

The first and second insulative tubes 30, 30A and the number of annular ribs 74 can be made of a material selected from the group consisting of epoxy, glass polyester and porcelain.

The third terminal member 50 and the fourth terminal member 52 are electrical connected to insulated conductors 76, 78, which pass through the second ends 62, 68 of the first and second insulative tubes 30, 30A, respectively.

EXAMPLE 10

Further to Example 4, as shown in FIGS. 7 and 8, an electrical switching apparatus 32", which is similar to the electrical switching apparatus 32 of FIGS. 3 and 4, employs the insulative tubes 31, 31A. The first insulative tube 31 includes an interior surface 80 carrying a number of third insulative skirts 82. The second insulative tube 31A includes an interior surface 84 carrying a number of fourth insulative skirts 86. Each one of the number of third insulative skirts 82 engages one insulative skirt of the number of first insulative skirts 54 in the first position (FIG. 8). Each one of the number of fourth insulative skirts 86 engages one insulative skirt of the number of second insulative skirts 56 in the first position (FIG. 8).

The count of the number of third or fourth insulative skirts 82 or 86 can be greater than or equal to (as shown in FIGS. 7 and 8) the count of the number of first or second insulative skirts 54 or 56. The count of the third or fourth insulative skirts 82 or 86 is dictated by the desired dielectric withstand capability since the insulative skirts 82, 86 increase the over surface tracking path between the opposite ends of the insulative tubes 31, 31A. The insulative skirts 82, 86 advantageously function to provide extended creep distance, provide a relatively better seal, and provide relatively better moisture protection than corresponding structures in the electrical switching apparatus 32 of FIG. 3.

EXAMPLE 11

The number of first and second insulative skirts 54, 56 can be part of a silicone tube 87 (shown in phantom line drawing in FIG. 3) disposed around (e.g., a membrane, which is cold shrunk) one of the respective elongated first and second elongated conductors 36, 43, which can be insulated cylindrical conductors.

The number of third and fourth insulative skirts 82, 86 of FIG. 7 can be part of a silicone tube 88 disposed within one of the respective insulative tubes 31, 31A. Except for the insulative skirts 82, 86, the insulative tubes 31, 31A can be the same as or similar to the insulative tubes 58, 64 of FIG. 3.

EXAMPLE 12

The number of first, second, third and fourth insulative skirts 54, 56, 82, 86 can be made of a material selected from the group consisting of silicone and PVC. Alternatively, any other suitable flexible, relatively high dielectric material can be employed.

EXAMPLE 13

The elongated first and second conductors 36, 43 of FIGS. 3-8 can be covered by a suitable insulative material 90 (e.g., without limitation, epoxy).

EXAMPLE 14

The first terminal member 42 and the third terminal member 50 can be structured to cooperate to provide a plurality of electrical connection points 92 therebetween as shown in FIG. 4. Non-limiting examples of the first terminal member 42 and the third terminal member 50 include a conductive stud (or flat bar) and a conductive finger cluster, respectively, which have a plurality of electrical connection points therebetween. Other suitable multi-point conductors include, for example and without limitation, a Canted-coil™ spring contact marked by Bal Seal® Engineering, Inc. of Foothill Ranch, Calif.; a Dynaflex™ Slanted Coil/Canted Coil, Helical Wound Flat Ribbon Coil or V-Shape Cantilever Beam spring contact marketed by Nelson Products, Inc. of Golden, Colo.; or any suitable technology employing a plurality of rigid contact points on strips of a conductor, such as copper.

EXAMPLE 15

The first and second insulative tubes 58, 64, 30, 30A or 31, 31A can be made of a material selected from the group consisting of epoxy, glass polyester and porcelain.

EXAMPLE 16

As shown in FIG. 3, a grounded panel 94 supports the first and second insulative tubes 58, 64.

EXAMPLE 17

The elongated first and second conductors 36, 43 of FIG. 3 can be cylindrical conductors covered by the insulative material 90. The first and second insulative tubes 30, 30A or 31, 31A can have a cylindrical interior 96. The first and second insulative skirts 54, 56 can have a circular perimeter, which can engage the smooth interior surface 72 of FIG. 4, engage the annular ribs 74 of FIG. 6, or engage the insulative skirts 86 of FIG. 8.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electrical switching apparatus comprising:
a number of poles, each of said number of poles comprising:
an elongated conductor including a first end, an opposite second end and a first terminal member disposed at the opposite second end,
a circuit interrupter electrically connected in series with the elongated conductor at the first end of the elongated conductor,
a second terminal member structured to electrically engage said first terminal member,
a number of insulative skirts disposed on the elongated conductor between the first end and the opposite second end thereof, and
an insulative tube structured to receive said number of insulative skirts, said insulative tube including a first open end and an opposite second end carrying said second terminal member; and
a carrier carrying said number of poles between (a) a first position in which said first terminal member electrically engages said second terminal member and said insulative tube receives said number of insulative skirts, and (b) a second position in which said first terminal member is electrically disconnected from said second terminal member and said number of insulative skirts are withdrawn from said insulative tube.

2. The electrical switching apparatus of claim 1 wherein said number of insulative skirts are made of a material selected from the group consisting of silicone and PVC.

3. The electrical switching apparatus of claim 1 wherein said insulative tube includes a smooth interior surface that engages said number of insulative skirts in said first position.

4. The electrical switching apparatus of claim 1 wherein said insulative tube includes a number of annular ribs disposed from a smooth interior surface; and wherein each one of said number of annular ribs engages one insulative skirt of said number of insulative skirts.

5. The electrical switching apparatus of claim 1 wherein said number of insulative skirts are a number of first insulative skirts; wherein said insulative tube includes an interior surface carrying a number of second insulative skirts; and wherein each one of said number of first insulative skirts engages one insulative skirt of said number of second insulative skirts in said first position.

6. The electrical switching apparatus of claim 5 wherein said number of first and second insulative skirts are made of a material selected from the group consisting of silicone and PVC.

7. An electrical switching apparatus comprising:
a number of poles, each of said number of poles comprising:
an elongated first conductor including a first end, an opposite second end and a first terminal member disposed at the opposite second end,
an elongated second conductor including a first end, an opposite second end and a second terminal member disposed at the opposite second end of the elongated second conductor,
separable contacts electrically connected between the first end of the elongated first conductor and the first end of the elongated second conductor,
a third terminal member structured to electrically engage said first terminal member,
a fourth terminal member structured to electrically engage said second terminal member,
a number of first insulative skirts disposed on the elongated first conductor between the first end and the opposite second end thereof,
a number of second insulative skirts disposed on the elongated second conductor between the first end and the opposite second end thereof,
a first insulative tube structured to receive said number of first insulative skirts, said first insulative tube including a first open end and an opposite second end carrying said third terminal member, and
a second insulative tube structured to receive said number of second insulative skirts, said second insulative tube including a first open end and an opposite second end carrying said fourth terminal member; and
a carrier carrying said number of poles between: (a) a first position in which said first terminal member electrically engages said third terminal member, said second terminal member electrically engages said fourth terminal member, said first insulative tube receives said number of first insulative skirts, and said second insulative tube receives said number of second insulative skirts, and (b) a second position in which said first terminal member is electrically disconnected from said third terminal member and said number of first insulative skirts are withdrawn from said first insulative tube, and said second terminal member is electrically disconnected from said fourth terminal member and said number of second insulative skirts are withdrawn from said second insulative tube.

8. The electrical switching apparatus of claim 7 wherein said electrical switching apparatus is selected from the group consisting of a vacuum circuit interrupter, an air circuit interrupter, an SF6 circuit interrupter, and a fuse.

9. The electrical switching apparatus of claim 7 wherein a voltage difference exists between said third terminal member and said fourth terminal member when said separable contacts are open, said third terminal member is energized and said fourth terminal member is grounded or at a different potential than said third terminal member.

10. The electrical switching apparatus of claim 7 wherein each of said number of first and second insulative skirts is made of a material selected from the group consisting of silicone and PVC.

11. The electrical switching apparatus of claim 7 wherein each of said first and second insulative tubes includes a smooth interior surface that engages said number of first and second insulative skirts, respectively, in said first position.

12. The electrical switching apparatus of claim 7 wherein each of said first and second insulative tubes includes a number of annular ribs disposed from a smooth interior surface; and wherein each one of said number of annular ribs engages one insulative skirt of said number of first and second insulative skirts.

13. The electrical switching apparatus of claim 12 wherein said first and second insulative tubes and said number of annular ribs are made of a material selected from the group consisting of epoxy, glass polyester and porcelain.

14. The electrical switching apparatus of claim 7 wherein said first insulative tube includes an interior surface carrying a number of third insulative skirts; wherein said second insulative tube includes an interior surface carrying a number of fourth insulative skirts; wherein each one of said number of third insulative skirts engages one insulative skirt of said number of first insulative skirts in said first position; and wherein each one of said number of fourth insulative skirts engages one insulative skirt of said number of second insulative skirts in said first position.

15. The electrical switching apparatus of claim 14 wherein said number of first, second, third and fourth insulative skirts are made of a material selected from the group consisting of silicone and PVC.

16. The electrical switching apparatus of claim 7 wherein said elongated first and second conductors are covered by an insulative material.

17. The electrical switching apparatus of claim 7 wherein each of said number of first and second insulative skirts comprises a plurality of insulative skirts disposed on an insulative tube; and wherein each of said elongated first and second conductors comprises a cylindrical conductor covered by an insulative material.

18. The electrical switching apparatus of claim 7 wherein said first terminal member and said third terminal member are structured to cooperate to provide a plurality of electrical connection points therebetween.

19. The electrical switching apparatus of claim 7 wherein said first and second insulative tubes are made of a material selected from the group consisting of epoxy, glass polyester and porcelain.

20. The electrical switching apparatus of claim 7 wherein a grounded panel supports said first and second insulative tubes.

21. The electrical switching apparatus of claim 7 wherein said elongated first and second conductors are cylindrical conductors covered by an insulator; wherein said first and second insulative tubes have a cylindrical interior; and wherein said first and second insulative skirts have a circular perimeter.

22. A pole for an electrical switching apparatus including a carrier carrying said pole between a first position and a second position, said pole comprising:
an elongated conductor including a first end, an opposite second end and a first terminal member disposed at the opposite second end;

a circuit interrupter electrically connected in series with the elongated conductor at the first end of the elongated conductor;

a second terminal member structured to electrically engage said first terminal member;

a number of insulative skirts disposed on the elongated conductor between the first end and the opposite second end thereof; and an insulative tube structured to receive said number of insulative skirts, said insulative tube including a first open end and an opposite second end carrying said second terminal member, wherein said first terminal member is structured to electrically engage said second terminal member and said insulative tube is structured to receive said number of insulative skirts in said first position, and wherein said first terminal member is structured to electrically disconnect from said second terminal member and said number of insulative skirts are structured to be withdrawn from said insulative tube in said second position.

* * * * *